United States Patent [19]

Voisine

[11] Patent Number: 4,465,096

[45] Date of Patent: Aug. 14, 1984

[54] FLUID VALVE COUPLING

[75] Inventor: Leo G. Voisine, New Bedford, Mass.

[73] Assignee: Alpha Couplings, Inc., New Bedford, Mass.

[21] Appl. No.: 279,562

[22] Filed: Jul. 1, 1981

[51] Int. Cl.³ .............................................. F16L 37/28
[52] U.S. Cl. .......................... 137/614.04; 137/614.01; 285/316; 285/321
[58] Field of Search ............................... 285/316, 321; 137/614.01, 614.02, 614.03, 614.04; 251/149.6, 149.8

[56] References Cited

U.S. PATENT DOCUMENTS

| 2,819,914 | 1/1958 | Eitner | 137/614.04 |
| 3,120,968 | 2/1964 | Calvin | 285/321 |
| 3,177,018 | 4/1965 | Goodwin | 285/321 |
| 3,217,746 | 11/1968 | Voisine | 137/614.04 |

FOREIGN PATENT DOCUMENTS 0023853 2/1981 European Pat. Off. ............ 285/316

Primary Examiner—A. Michael Chambers
Attorney, Agent, or Firm—Shlesinger, Arkwright, Garvey & Fado

[57] ABSTRACT

A breakaway fluid valve coupling including a pair of identical coupling members each of which is connected to an end of a fluid conveying pipe. The coupling members are joined together to allow fluid to pass through the pipe and fluid valve coupling. The coupling members are pulled apart by exertion of axial stress on the members, the coupling members automatically sealing the ends to prevent leakage of the fluid.

8 Claims, 15 Drawing Figures

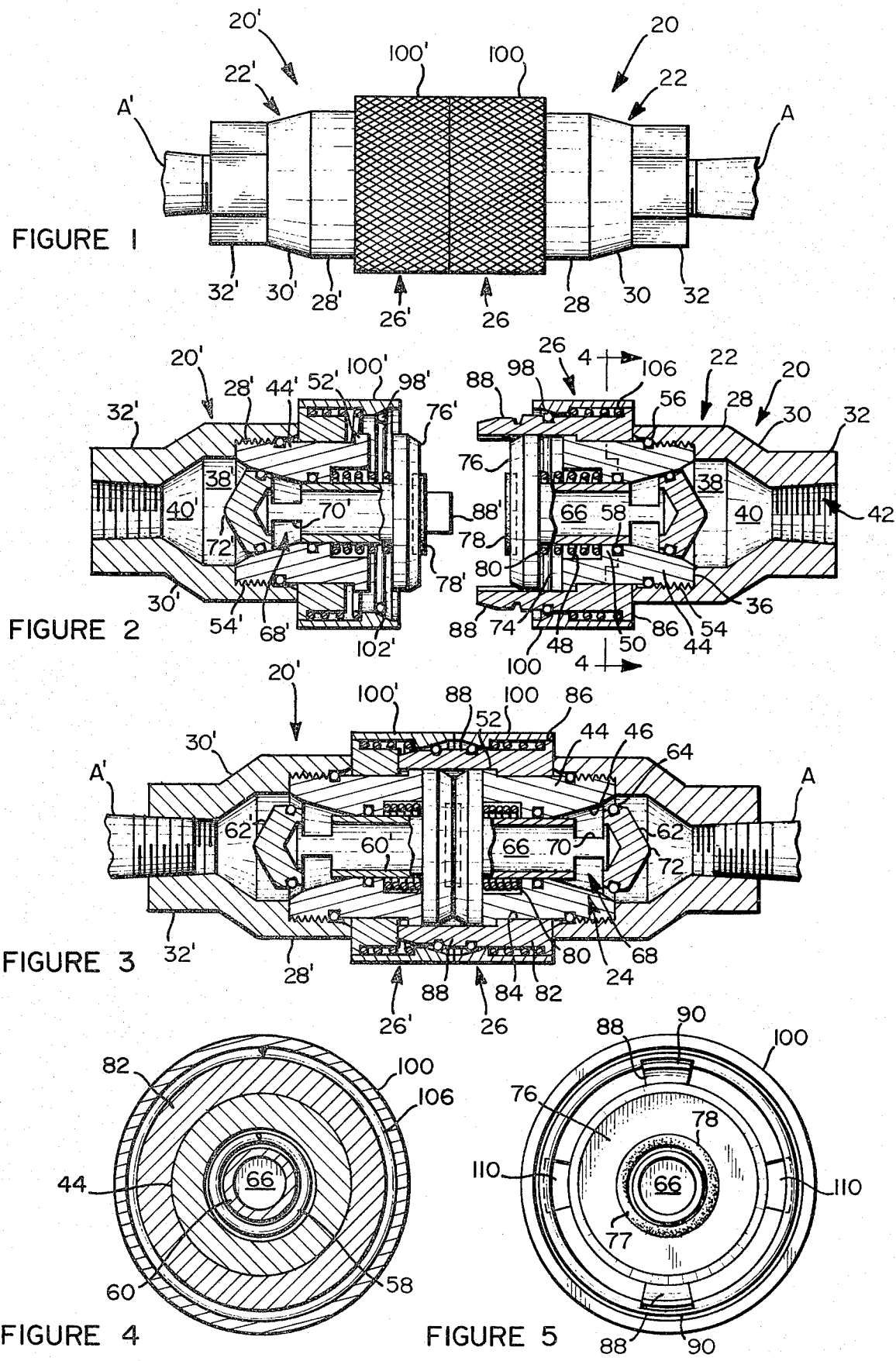

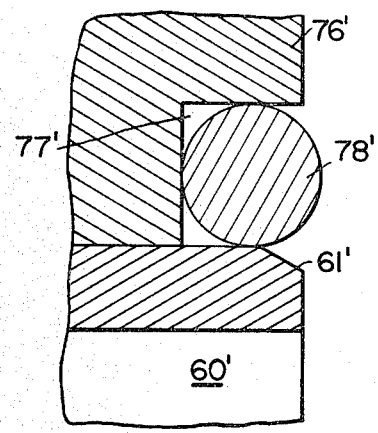
FIG. 6a.
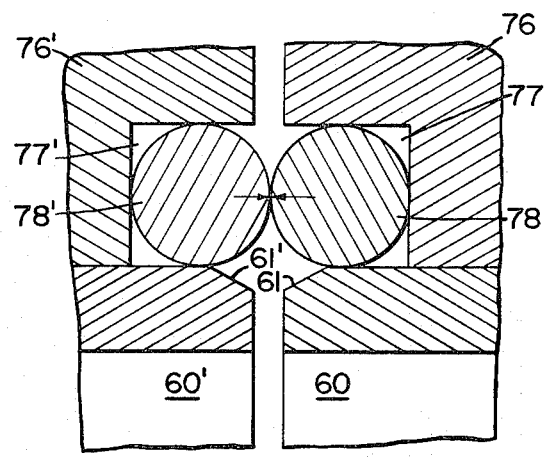
FIG. 6b.
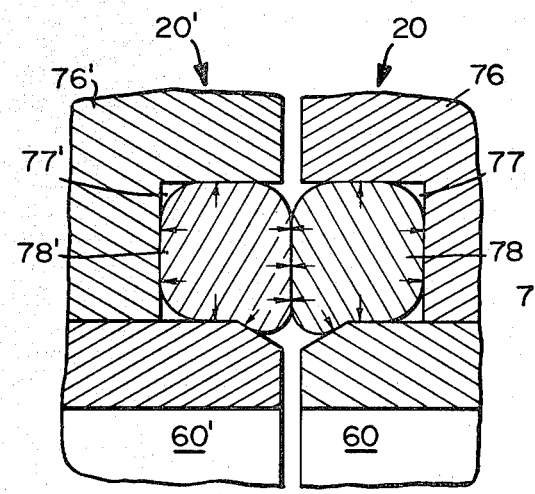
FIG. 6c.
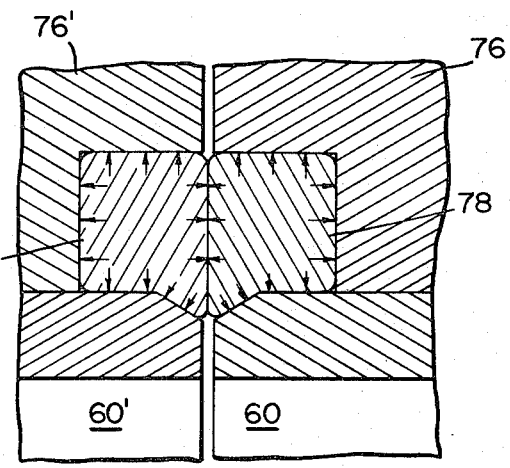
FIG. 6d.
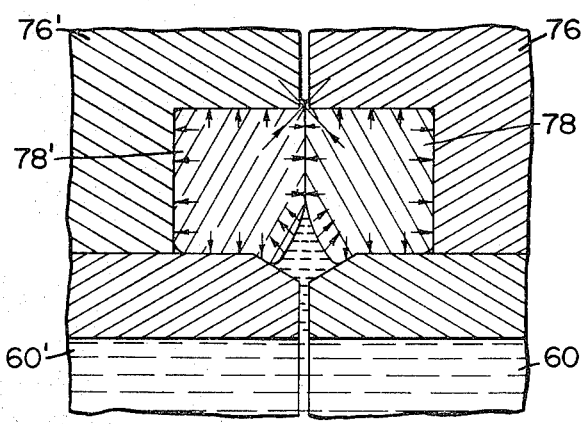
FIG. 6e.
FIG. 6
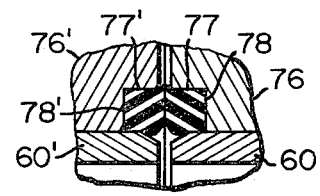

FLUID VALVE COUPLING

BACKGROUND OF THE INVENTION

This invention relates to a fluid valve coupling for hose or pipe ends.

Many fluid valve couplings have been devised, most of which require male and female coupling members. There have, however, been devised fluid valve couplings comprising coupling members of identical construction, such as disclosed in my previously granted U.S. Pat. No. 3,217,746 and in U.S. Pat. Nos. 3,168,335; 3,176,717 and 3,564,918.

SUMMARY OF THE INVENTION

The present invention is a quick disconnect fluid valve coupling of basically simple design, providing a free flow of fluid under high pressure, the coupling embodying coupling members of identical construction which may be quickly and easily interengaged and retained in locked position, and which provides an efficient and tight mechanical seal, each coupling member automatically sealing itself upon disconnection.

The coupling comprises a plurality of readily manufactured and assembled parts which are capable of operating within a broad range of temperatures and pressures, with caustic or non-caustic materials, the coupling members being connected by an interlocking lug system of a type which permits engagement and disengagement thereof by hand. The components of the interlocking lug system are internal of the outermost portion of the coupling to prevent the entry of foreign matter into the coupling at the locus of connection of the coupling members.

The coupling members include interengageable retaining elements for maintaining the lugs of the coupling members in interlocked relationship, thereby preventing accidental disengagement of the coupling due to vibration, etc. The coupling members include breakaway locking means adapted to normally retain the coupling members in locked, coupled position, the coupling members separating upon exertion of predetermined axial stress on the coupling.

The retaining elements for retaining the lugs in interlocked relationship include circular spring clips held in retaining recesses on the outer surfaces of the lugs, which clips engage complemental recesses in the outer surfaces of the lugs of the opposed coupling member. Locking means for normally preventing accidental disengagement of the coupling members include a collar around the housing of each member for urging the circular clip and complemental recesses into locking relationship.

DESCRIPTION OF FIGURES OF THE DRAWINGS

FIG. 1 is a plan view of the breakaway fluid valve coupling of the present invention, showing the coupling members in coupled position;

FIG. 2 is an enlarged longitudinal sectional view of the breakaway fluid valve coupling of the present invention, showing the coupling members in uncoupled position;

FIG. 3 is a view similar to FIG. 2, showing the coupling members in coupled position;

FIG. 4 is a sectional view taken along the line 4—4 of FIG. 2, looking in the direction of the arrows;

FIG. 5 is an enlarged end elevational view of one of the coupling members of the present breakaway fluid valve coupling, showing to advantage the valve sealing member and interlocking lug assembly forming a part thereof;

FIG. 6 is an enlarged fragmentary sectional view of the coupling members showing to advantage the valve sealing members in the coupled position illustrated in FIG. 3;

FIGS. 6a to 6e are diagrammatic views illustrating the position assumed by the sealing members during the steps of coupling of the coupling members.

DESCRIPTION OF THE INVENTION

Figure 7:
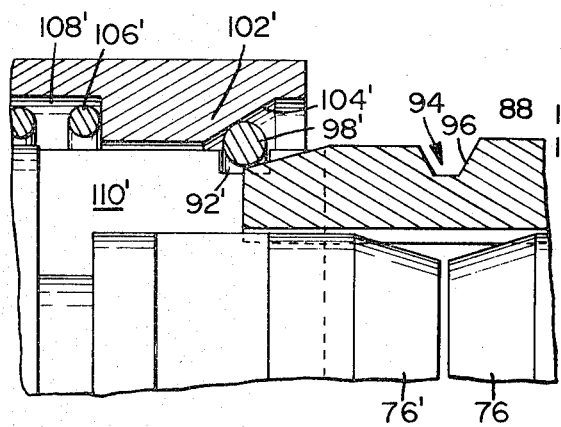
FIGS. 7 to 11 are enlarged fragmentary sectional views illustrating the steps of coupling of the coupling members comprising the breakaway fluid valve coupling of the present invention.

Referring now in greater detail to the drawings, and more particularly to FIGS. 1 to 3, the breakaway fluid valve coupling of the present invention comprises a pair of coupling members designated 20 and 20', which are of identical construction. Because of the identify in construction, only coupling member 20 will be described in detail, the corresponding parts of coupling member 20' being identified in the drawings by like, primed numbers.

Coupling member 20 includes a valve housing 22, a valve assembly 24 and an interlocking lug assembly 26. Valve housing 22 comprises a cylindrical body 28 which is of uniform external diameter throughout a portion of its length, one terminal of which tapers inwardly at 30 and issues into an internally threaded extension 32 of reduced diameter adapted for engagement with a hose or pipe A through which fluid passes. A portion of the internal periphery of body portion 28 is thickened to provide an abutment or a shoulder 36. An enlarged axial bore 38 is thereby formed within the body portion 28, the diameter of which bore is gradually decreased through tapering portion 30, as indicated at 40, and issues into an axial bore 42 of very slightly increasing diameter, formed within threaded extension 32.

Valve assembly 24 includes a cylindrical valve body 44 having an axial bore, one end of which bore is flared to provide a tapered valve seat 26. The valve assembly bore is in communication with enlarged bore 38 of valve housing 26, and is enlarged at 48, thereby forming an internal annular shoulder or abutment 50. The terminal of cylindrical valve body 44 adjacent enlarged bore 48 is externally thickened to provide a peripheral annular abutment 52.

The opposite terminal of cylindrical valve body 44 is threadedly engaged with the inner periphery of cylindrical body 34 as indicated at 54. Adjacent the point of threaded engagement of cylindrical body 44 with body portion 34, there is provided an annular recess adapted for the reception of a sealing ring 56. Cylindrical valve body 44 is also provided with an inner peripheral annular recess which is also adapted for the reception of a sealing ring 58.

Valve assembly 24 further includes a movable poppet valve 60 extending longitudinally through the valve assembly bore and enlarged bore 48. The outer terminal of poppet valve 62 is exteriorly chamfered for purposes which will be hereinafter more fully set out. The opposite terminal of poppet valve 60 is gradually enlarged to form a tapered head 62, the peripheral portion of which is complemental to, and adapted for engagement with, tapered valve seat 46. Tapered head 62 is provided with an annular recess in which is a sealing ring 64 which engages tapered valve seat 46 when the valve is in the closed position shown in FIG. 2.

Poppet valve 60 has an axial bore 66 which extends from the inner terminal of the valve to a point lying within tapered head 62, at which point there are provided ports 68 which, as shown to advantage in FIG. 3, permit the passage of fluid from bore 66 into the valve assembly bore, or vice versa. Ports 68 extend through a substantial portion of the poppet valve's periphery, thereby forming webs 70 connecting the main portion of valve body 60 to tapered head 62. The free terminal of tapered head 62 is cone-shaped as indicated at 72, for optimum flow characteristics of the fluid through the coupling member.

As shown to advantage in FIG. 2, that portion of poppet valve 60 remote from tapered head 62 extends beyond the terminal of valve body 44 through a bore 74 formed by interlocking lug assembly 26. An end sealing member 76 of disc shape, has a central bore fitted over the end portion of poppet valve body 60 and is uniplanar with the terminal thereof. End sealing member 76 is of substantially the same diameter as the inner periphery of interlocking lug assembly 26. The central bore of sealing member 76 is enlarged at its outer extremity so that, in conjunction with the terminal outer periphery of poppet valve body 60, an annular recess 77 is formed in which a sealing ring 78, preferably an "O" ring made of buna, neoprene or other suitable material, is positioned.

A convolute spring 80 lies circumjacent valve body 60, one end of which spring engages the rear face of end sealing member 76 and the other end of which engages abutment 50 of valve body 44. Spring 80 serves to effect longitudinal movement of valve assembly 24 to the extended position shown in FIG. 2, poppet valve 60 being in sealing engagement with valve seat 46.

When coupling members 20 and 20' are interengaged, end sealing member 76 is forced rearwardly against the tension of spring 80 until the rear face of the end sealing member 76 engages the terminal of valve body 44 and tapered head 62 is lifted out of engagement with valve seat 46 to permit flow of fluid between ports 68 and axial bore 38.

In accordance with the present invention, lug assembly 26 includes a cylindrical body portion 82, having an axial bore which is reduced in diameter from the inner terminal of the body to a point intermediate its length to provide an annulus 84 extending from the forward terminal of cylindrical body 28 to peripheral abutment 52. The inner periphery of body portion 82 is in contiguous engagement with the outer periphery of cylindrical body 44, the body portion being rotatable with respect to, and independent of, the valve body. The outer periphery of body portion 82 is extended at the terminal adjacent cylindrical body 28 to provide an annular abutment 86, the function of which will be hereinafter more fully set out.

As shown in FIGS. 7 to 11, the terminal of body portion 82 remote from abutment 86 is extended on diametrically opposed sides thereof to provide transversely arcuate, rectangular, locking fingers or lugs 88 extending beyond end sealing member 76 a predetermined distance, the terminal portions of which lugs are chamfered at 90. The outer surfaces of lugs 88 are provided with pairs of spaced transverse notches or recesses including an inner recess 92 and an outer recess 94, the recesses of one lug being vertically aligned with the corresponding recesses of the other lug. The side walls defining inner recess 92 are preferably vertical, while those of outer recess 94 are inwardly sloping from top to bottom as indicated at 96, for purposes hereinafter more fully set out. A circular clip 98 of spring wire or other suitable material, lies circumjacent lugs 88, diametrically opposed portions thereof being fitted in inner recesses 92 of lugs 88.

Lug assembly 26 further includes a cylindrical clip-retaining collar 100, the aft terminal of which is contiguous with the outer periphery of annular abutment 86. An internal shoulder 102 is provided adjacent the forward extremity of collar 100, the leading edge of which shoulder is sloped or beveled at 104 for exerting constant pressure on clip 98 in a direction to retain the latter within recesses 92. Pressure is maintained on the clip by a convolute spring 106 disposed in a peripheral recess 108 lying between collar 100 and cylindrical body portion 82. One terminal of spring 106 engages fixed abutment 86 and the opposite terminal thereof engages terminal shoulder 102, thereby effecting longitudinal movement of clip-retaining collar 100 to constantly maintain pressure on clip 98.

Arcuate lug-receiving recesses 110, shown in FIG. 4, are formed between lugs 88 in the space separating cylindrical valve body 44 and clip-retaining collar 100. Recesses 110 are of a size and shape to receive the opposed lugs 88' of coupling member 20'.

OPERATION

In use of the present breakaway coupling, pipe terminals A and A' are threaded or secured in any other suitable fashion to extensions 32, 32' of valve housings 22, 22'. Lug assemblies 26, 26' are then rotated until lugs 88, 88' lie in planes at right angles to each other, as shown in FIG. 2. Coupling of the members is then effected by direct longitudinal movement of lugs 88 into lug receiving recesses 110' and lugs 88' into lug receiving recesses 110. This effects engagement of sealing rings 78, 78' of end sealing members 76, 76', thereby effecting the rearward movement of valve assemblies 24, 24' to move the latter to the operative position shown in FIG. 3. Movement of lugs 88, 88' into their respective recesses is continued until clip 98 operatively engages outer arcuate recesses 94' of lug 88', and clip 98' operatively engages outer arcuate recesses 94 of lug 88, thereby locking the coupling members in operative coupled position.

The operations involved in coupling and uncoupling the breakaway coupling, can be better understood by reference to the enlarged fragmentary views of the interlocking cycle illustrated in FIGS. 7 to 11. FIG. 7 shows lug 88 initially in the process of being inserted into its mating recess 110', at which time spring clip 98' is in tension and has been lifted from retaining recess 92 by the upward force from the lateral motion imparted by the chamfered portion 90 of lug 88. Spring clip 98 is lifted out of its retaining recess 92 in similar fashion. This action creates rearward pressure on collars 100, 100', against the tension of springs 106, 106'. Continued movement of lug 88 into the recess 110' exerts a maximum force on spring clip 98 in the position of FIG. 8, which also sets up forces downwardly and forwardly because of the mechanical actions of the respective coupling parts in relation to each other.

Figure 9:
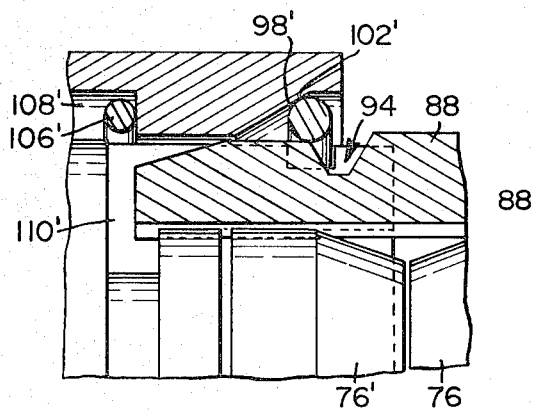
Figure 10:
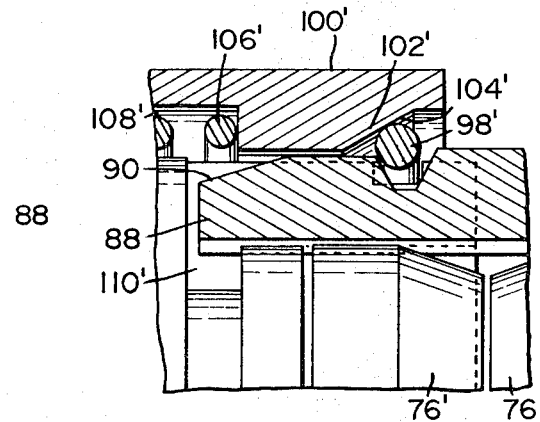

Further continued actual movement as shown in FIG. 9 places spring clip 98′ at the edge of outer recess 94, this action occurring simultaneously at all lug locations. Referring to FIG. 10, it will be seen that as spring clip 98′ attempts to return to its partially relaxed position against the inclined side wall of recess 94, a force is created in relation to lug 88 which is a function of a sine of angular recess 94. Also, at the same time, still another force comes into play, which is that force created by convolute spring 106′ which forces beveled shoulder 104′ of pressure collar 100′ into engagement with spring clip 98′. By reason of spring 106′ and the mechanical advantage of beveled shoulder 104′, spring clip 98′ is forced further into recess 94 and lug 88 is urged into recess 110′.

Figure 8:
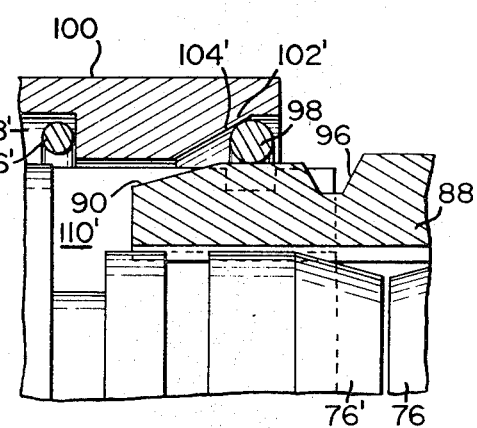
Figure 11:
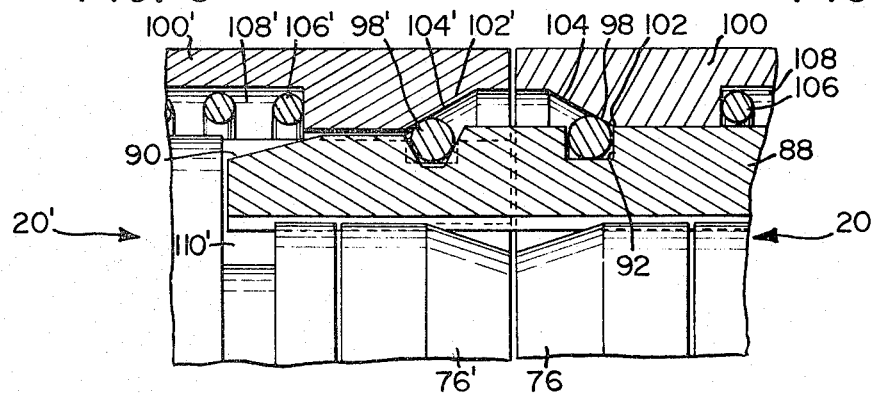

It will be noted from a consideration of FIGS. 7 to 11 that certain relationships are important for optimum operation of the breakaway coupling. The distance between lugs 88 and the forward terminal of collar 100′, as viewed in FIG. 8, is sufficient to maintain clearance for spring clip 98′; recesses 92, 92′ are deep enough to prevent escape of spring clips 98, 98′ therefrom (see FIG. 11); the outermost wall defining arcuate recesses is slightly lower than the inner wall, to facilitate engagement of clips 98, 98′ therein; the preloaded position of spring clips 98, 98′ is such that these units are forced into the position shown in FIG. 10 and the clips will lie in spaced relation to the bottom of annular recesses 94, 94′ as shown in FIG. 11; the urging of spring 106, 106′ is of sufficient force to maintain constant pressure on collars 100, 100′; and that the opposed faces of the coupling members never come into direct contact with each other, i.e., a clearance is maintained between these two surfaces. The mechanical advantage imposed upon lug 88 in a lefthand direction into the relation of recess 110′ in a righthand direction, is in the order of 2:1 with respect to each other, in the position illustrated in FIG. 10.

It is a salient feature of the present invention to provide a coupling so designed that the immediate sealing of members 76, 76′ is effected by the longitudinal force exerted by convolute springs 80, 80′ on sealing rings 78, 78′ while simultaneously effecting the interlocking cycle illustrated in FIGS. 7 to 11. By virtue of the present arrangement of parts, the exertion of the longitudinal forces on the opposed "O" rings and the interlocking cycle occur very nearly simultaneously. The passage of fluid through the coupling is, however, effected just prior to the completion of the interlocking of the coupling members. As soon as sufficient longitudinal force is exerted against sealing rings 78, 78′, the pressure exerted by convolute springs 80, 80′ is overcome, thus forcing the coupling members' poppet valves open, allowing the passage of fluid immediately. Any pressures present in line A, A′ at the moment of connection of the coupling members enhances the effectiveness of the sealing components, as shown in FIGS. 6a to 6e.

Referring to FIGS. 6a to 6e, it will be seen that, upon interlocking of coupling members 20, 20′, opposed sealing rings 78, 78′ are flattened within the angular recesses 77, 77′ to positively preclude any leakage of fluid therebetween. The fluid may then pass, for example, through the pipe or hose A, through axial bores 42, 40 and 38 to ports 68 of the valve assembly and thence into axial bore 66 of poppet valve 60. Fluid flow is continued through axial bore 66′ of poppet valve 60′, thence through ports 68′ into bores 38′, 40′ and 42′ and into connecting hose or pipe A′.

It will be noted from a consideration of FIGS. 2 and 3, that valve housing 22 and valve assembly 24 are so constructed to provide a minimum of resistance to the flow of fluid through the coupling.

In FIGS. 6a to 6e, there is illustrated the action of the sealing members during the coupling operation. FIG. 6a shows an end seal "O" ring within angular recess 77′ prior to engagement with an opposed "O" ring. For optimum results, the "O" ring is in engagement with the side walls and bottom wall of the recess and approximately 10 percent of its cross sectional area protrudes from the recess.

FIG. 6b shows the "O" ring in contact as the sealing action is initiated, as indicated by the arrows showing the direction of forces being exerted. Since the "O" rings initially protrude from the recesses by approximately 10 percent, there is at this state of the coupling action, a gap of 0.020 inches between opposed faces of sealing members 76, 76′.

FIG. 6c represents the condition of the sealing "O" ring immediately prior to exertion of spring pressure generated by forcing springs 80, 80′ rearwardly. Complete sealing is effected at this time and annular bores 66, 66′ are in communication. However, bores 38, 40, 42 and 38′, 40′, 42′ are not in communication until further lateral pressure required to force the convolute springs 80, 80′ rearwardly against the tension thereof is exerted, and force tapered heads 62, 62′ out of communication with their valve seats 46, 46′. Fluid flow through the coupling is thereby permitted.

FIG. 6d represents the position of the sealing "O" rings when the coupling members are fully interlocked as shown in FIG. 3. In this position, the gap between sealing members 76, 76′ has been reduced to its operational tolerance and "O" rings 78, 78′ are completely captivated in their respective recesses. Thus, the rings, under pressure, cannot escape or be forced into poppet valve bores 66, 66′ since they are retained by the outer wall of the poppet valves 60, 60′. Under compression, the chamfered leading terminals 61, 61′ of poppet valves 60, 60′ permit portions of the ring to be displaced into the cavity formed by the communication of the opposed chambered terminals. Any captured air in the areas of the sealing ring recesses is pressurized and tends to force the rings into a tighter sealing engagement with each other and their surrounding walls.

FIG. 6e diametrically depicts the positions of the "O" ring when the coupling is fully connected and flow of fluid is taking place under pressure. During exertion of high pressures through bores 66, 66′, these pressures are also being exerted on sealing rings 78, 78′ since the pressurized fluid is attempting to pass the "O" ring seals. However, under sufficient pressure through bores 66, 66′, the displaced "O" rings in the cavity formed by the leading chamfered terminals 61, 61′ of poppets 60, 60′, shown in FIG. 6d, now tend to be displaced further into their own restricting recesses. The pressures exerted then become a factor of the sealing forces as indicated by the arrows of FIG. 6e.

The high pressures generated force "O" rings 78, 78′ into the slight gap between sealing members 76, 76′. However, since the interlocking mechanism is, by design, of sufficient strength to withstand the forces exerted within the operating range, the "O" rings cannot be extruded into the gap between the sealing members without stressing the lugs out of alignment.

To disconnect the coupled units by manual force, it is first necessary to move pressure collars 100, 100′ in a rearward direction against tension exerted by springs 106, 106'. Spring clips 98, 98' are thereby freed to move upwardly along the sloping side walls of recesses 94, 94' in respect to the mechanical tension of spring clips 98, 98'. Spring clips 98, 98' are retained within recesses 92, 92' in the manner set out supra.

In use of the breakaway coupling, it is normally required that the units be disconnected automatically, rather than manually, under predetermined force being exerted on the coupling. In automatic uncoupling, the reverse procedure would be followed than that set out above in connection with coupling the members, and a predetermined disconnection force may be designed into the coupling itself as, for example, by varying the tension of springs 106, 106'. The present breakaway coupling is also of value for automatically disconnecting and sealing fluid lines where, for example, the pressure in the fluid system suddenly increases beyond safe limits, or if external mechanical forces are exerted on the fluid lines beyond safe limits.

The interlocking lug assemblies 26, 26' retain the coupling members in interlocked relationship under forces sufficient to prevent accidental disengagement due to vibrations or the like. However, upon exertion of predetermined forces acting in opposite directions, clips 98, 98' will become disengaged from outer arcuate recesses 94, 94' respectively, to effect longitudinal movement of valve assemblies 24, 24' to the inoperative position under the urging of springs 80, 80'.

The breakaway coupling is particularly adapted for use in application where the pipe or hose members A, A' are normally not left in proximity to each other after uncoupling, such as of trailer tractors, where the trailers are unhooked from the cab. The use of the breakaway coupling positively precludes damage to air or hydraulic lines in the event that the coupling members are inadvertently left in coupled position during the removal of the cab from the trailer. As above set out, the forces exerted in opposite directions on the coupling members overcome the forces retaining the coupling members together, thereby effecting disconnection of the coupling members and sealing of the valve assemblies.

The fluid valve coupling of the present invention is of basically simple design and comprising components requiring no special or exotic machine processing or materials. By virtue of the identity of the coupling members, a minimum number of simple parts are required for the valve coupling. The valve operation of the coupling is a straight line motion on the longitudinal axis, accomplished by normal coupling action in accordance with the procedure above set out, with no rotational forces exerted on the component parts by virtue of a freely rotating interlocking lug system. The efficient and tight mechanical seal effected by the present arrangement of parts permits use thereof in both the coupled and uncoupled state under conditions of high pressure and vacuum and operating within a broad temperature range.

While there has been herein shown and described the presently preferred embodiment of this invention, it is to be understood that such has been done for purposes of illustration only and that various changes be made therein within the scope of the claims hereto appended.

What is claimed is:

1. A fluid valve coupling comprising
   (a) identical coupling members adapted for interconnection
   (b) each of said coupling members including a housing having an axial bore
   (c) the bore of said housing being flared near one terminal thereof to provide a tapered valve seat
   (d) a valve mounted in said bore and longitudinally movable with respect to said housing
   (e) said valve being of tubular construction throughout a substantial portion of its length for the transmission of fluid therethrough
   (f) ports in the periphery of said tubular valve spaced from the inner terminal of the valve, the ports being in communication with the axial bore of the housing
   (g) the inner terminal of said valve being enlarged to provide a tapered head, the peripheral portion of which is complemental to, and adapted for sealing engagement with, said tapered valve seat
   (h) tensioning means for normally urging said valve head into sealing engagement with the valve seat
   (i) end sealing members at the opposite end of said tubular valve, the end sealing members being forced together to effect longitudinal movement of each valve with respect to each housing for lifting the tapered head from the valve seat, to permit the flow of fluid, and
   (j) a lug assembly extending from opposed terminals of the coupling members for complemental engagement to effect locking of said members when the coupling is operative
   (k) said lug assembly including a cylindrical body rotatable with respect to said valve
   (l) spaced rectilinear lugs extending from a terminal of said cylindrical body
   (m) said lugs being transversely arcuate, and provided with inner and outer arcuate recesses in the outer periphery of said lugs
   (n) the respective inner and outer arcuate recesses of the lugs lying in vertical planes
   (o) the lug assembly of each coupling member further including a circular clip circumjacent said lug assembly, the inner periphery of said clip being positioned in the inner recesses of the lugs
   (p) the clip of each coupling member being adapted to be received in the outer recesses of the opposed coupling member lugs when the coupling members are interconnected by axial movement of one coupling member into the other, and
   (q) locking means carried by said lug assembly and automatically operable upon interengagement of the lug assemblies of opposed coupling members, to prevent accidental disengagement of the coupling members
   (r) said locking means including a collar surrounding said housing of each coupling member and in proximity to said lugs
   (s) a portion of said collar of each coupling member normally being in engagement with the circular clip, to maintain the latter in the outer recesses of the opposed coupling member lugs.

2. The fluid valve coupling of claim 1, wherein
   (a) said collar includes a cylindrical body
   (b) said cylindrical body having an internal shoulder engaged with said circular clip for retaining the latter in the inner recess of the lug.

3. The fluid valve coupling of claim 2, wherein
   (a) a portion of said internal shoulder is sloped, and
   (b) tensioning means engaged with said cylindrical body for urging the latter in a direction to maintain constant pressure by the sloped portion of said internal shoulder on said circular clip.

4. The fluid valve coupling of claim 3, wherein
(a) said tensioning means is a convolute spring.

5. A fluid valve coupling comprising
(a) a pair of coupling members adapted for interconnection
(b) each of said coupling members including a housing with an axial bore
(c) a portion of said housing being formed to provide a valve seat
(d) a valve having a fluid passageway mounted within said housing
(e) a portion of said valve being adapted for engagement with said valve seat to permit the passage of fluid through the coupling
(f) means for moving said valve longitudinally with respect to said housing to seat and unseat the valve and control the passage of fluid through the coupling members
(g) a lug assembly extending from opposed terminals of the coupling members for complemental engagement to effect locking of said members when the coupling is operative
(h) said lug assembly including a cylindrical body rotatable with respect to said valve
(i) spaced rectilinear lugs extending from a terminal of said cylindrical body
(j) said lugs being transversely arcuate, and provided with inner and outer arcuate recesses in the outer periphery of said lugs
(k) the respective inner and outer arcuate recesses of the lugs lying in vertical planes
(l) the lug assembly of each coupling member further including a circular clip circumjacent said lug assembly, the inner periphery of said clip being positioned in the inner recesses of the lugs
(m) the clip of each coupling member being adapted to be received in the outer recesses of the opposed coupling member lugs when the coupling members are interconnected by axial movement of one coupling member into the other, and
(n) locking means carried by said lug assembly and automatically operable upon interengagement of the lug assemblies of opposed coupling members, to prevent accidental disengagement of the coupling members
(o) said locking means including a collar surrounding said housing of each coupling member and in proximity to said lugs
(p) a portion of said collar of each coupling member normally being in engagement with the circular clip, to maintain the latter in the outer recesses of the opposed coupling member.

6. The fluid valve coupling of claim 5, wherein
(a) said collar includes a cylindrical body
(b) said cylindrical body having an internal shoulder normally engaged with said clip for retaining the latter in the outer recess of said lug.

7. The fluid coupling of claim 6, wherein
(a) a portion of said internal shoulder is sloped, and
(b) tensioning means engaged with said cylindrical body for urging the latter in a direction to maintain constant pressure by the sloped portion of said internal shoulder on said circular clip.

8. The fluid valve coupling of claim 7, wherein
(a) said tensioning means is a convolute spring.

* * * * *